July 21, 1959
E. E. BERNARD
2,895,477
DIAPER-HOLDING GARMENT
Filed Jan. 22, 1954
2 Sheets-Sheet 1
FIG. 1.
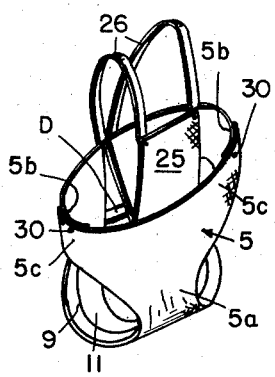
FIG. 2.
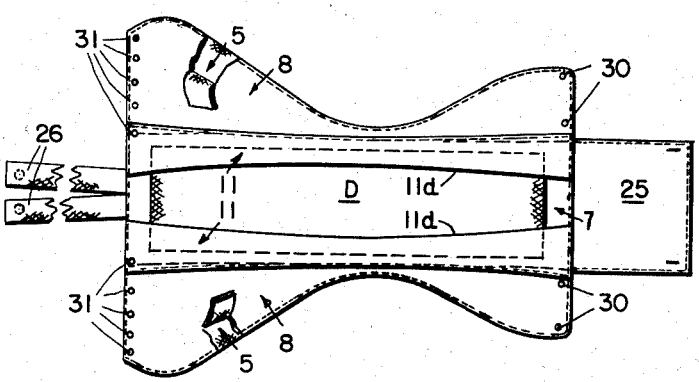
FIG. 3.
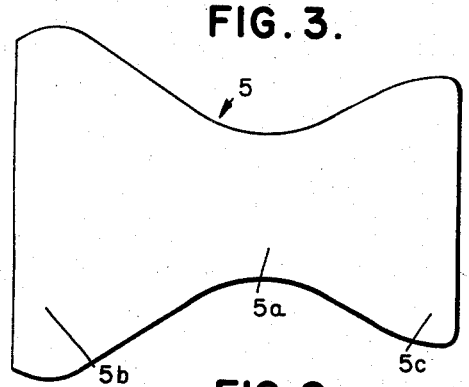
FIG. 4.
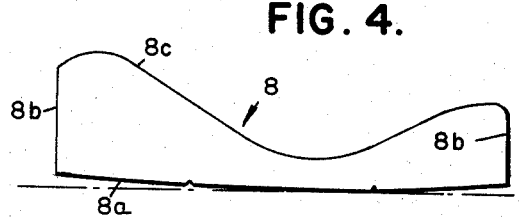
FIG. 5.
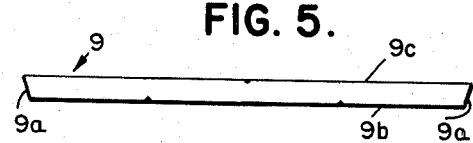
FIG. 8.
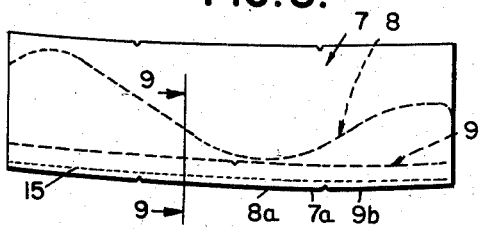
FIG. 6.
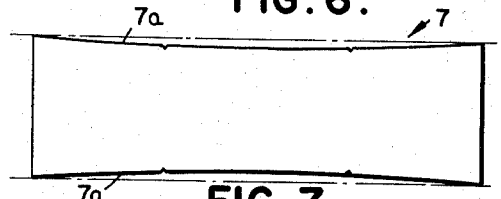
FIG. 9. FIG. 10.
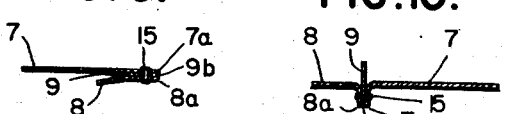
FIG. 7.
FIG. 11.
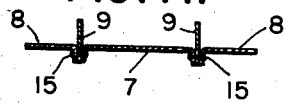
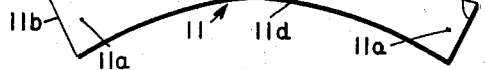
INVENTOR
EDITH E. BERNARD
BY
Mason & Graham
ATTORNEYS July 21, 1959     E. E. BERNARD     2,895,477
DIAPER-HOLDING GARMENT Filed Jan. 22, 1954                       2 Sheets-Sheet 2

INVENTOR
EDITH E. BERNARD
BY
*Mason & Graham*

ATTORNEYS

United States Patent Office 2,895,477
Patented July 21, 1959

2,895,477

DIAPER-HOLDING GARMENT

Edith E. Bernard, South Pasadena, Calif.

Application January 22, 1954, Serial No. 405,577

1 Claim. (Cl. 128—284)

This invention has to do with diaper-holding garments and methods of producing the same, and this application is a continuation in part of and an improvement upon my copending application Serial No. 315,746, filed October 20, 1958, now Patent 2,691,983.

Prior garments of which I am aware, possess the following shortcomings: (a) they are incapable of positively retaining the diaper in proper position, (b) they are so designed and arranged that it is relatively cumbersome to insert and remove the diaper from the pocket, and (c) they present manufacturing difficulties.

It is therefore a principal object of my present invention to provide a diaper-holding garment which may be economically manufactured and which embodies a diaper-holding pocket so constructed as to enable it to positively hold a diaper in proper position and to permit easy insertion and removal of the diaper from the pocket.

It is a further object to provide a novel method of making such a diaper-holding garment.

Other subordinate objects and advantages will become apparent from the following detailed description of a presently preferred embodiment and procedure, for which purpose I shall refer to the accompanying drawings, wherein:

Fig. 1 is a perspective view of a garment embodying my invention;

Fig. 2 is a top plan view of the garment in flattened position;

Figure 12:
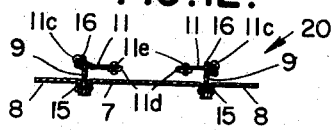
Figure 13:
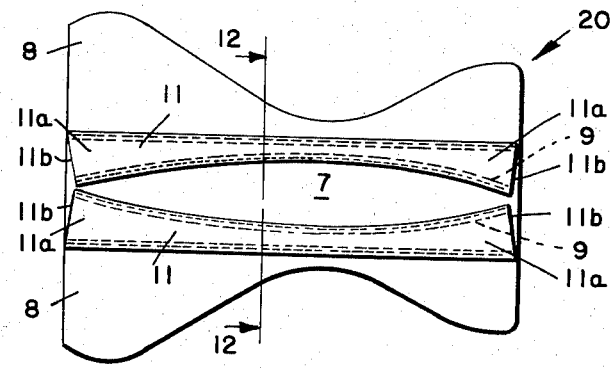
Figure 15:
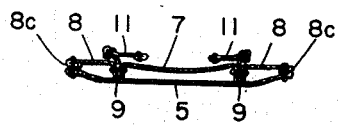
Figure 16:
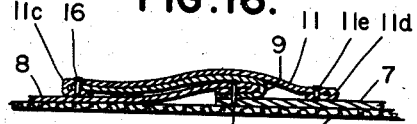
Figure 14:
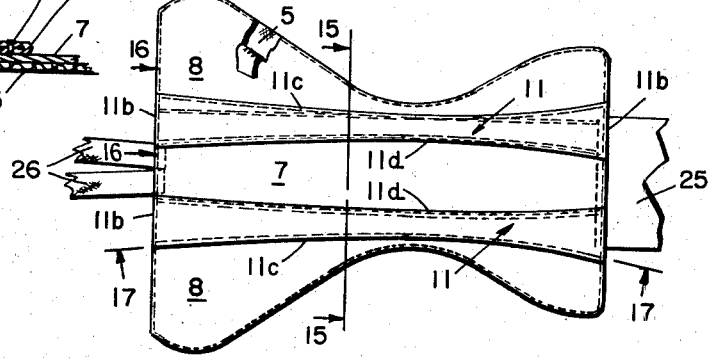

Figs. 3–7, inclusive, are plan views respectively showing various elements utilized in forming my garment;

Fig. 8 is a fragmentary plan view;

Fig. 9 is an enlarged section taken on line 9—9 of Fig. 8;

Figs. 10–12, inclusive, are enlarged sections illustrating the garment in various stages of manufacture;

Fig. 13 is a top plan view of the garment in one stage of its manufacture;

Fig. 14 is a view like Fig. 13 showing the completed garment;

Fig. 15 is an enlarged section taken on line 15—15 of Fig. 14;

Fig. 16 is an enlarged section taken on line 16—16 of Fig. 14; and

Figure 17:
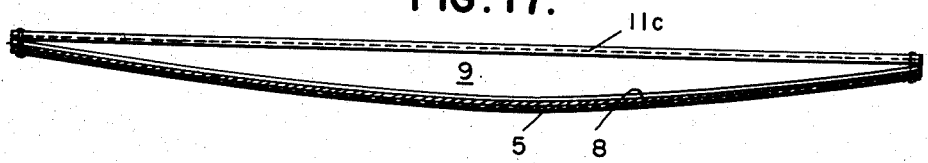

Fig. 17 is an enlarged section taken on line 17—17 of Fig. 14.

In carrying out my invention, I first cut from a suitable piece of cloth fabric an outer or body portion 5 (Fig. 3) which has a relatively narrow portion 5a intermediate its ends designed to fit between the legs of the infant, and relatively wide end portions 5b, 5c adapted to extend about the waist of an infant.

Next I cut, from a piece of water-resistant or waterproof material, several strips utilized to provide not only lining for the body but also a diaper-holding pocket.

The lining is composed of a center strip 7 (Fig. 6) having slightly concaved side edges 7a, but whose ends are preferably parallel and normal to the major axis of the body; and outer lining strips 8 (Fig. 4) whose inner edges 8a are slightly curved, whose outer ends 8b are parallel and whose outer side edges 8c are shaped to conform to the side edge portions of the body which they line.

Two like side strips 9 (Fig. 5) are provided, each having diagonal or converging ends 9a and straight parallel side edge 9b; and two like top pocket-forming strips 11 (Fig. 7) are provided. Each of the strips 11 is curved and has relatively wide end portions 11a terminating in diagonal end edges 11b, so that they are longer at their outer edges 11c than at their inner edges 11d.

In assembling the described parts, I turn the inner edges 8a of strip 8 and the outer side edges 7a of strip 7 downwardly, insert the bottom edges 9b of strips 9 therebetween, and provide stitching 15, as shown in Figs. 10 and 11. I also fold the outer edges 11c of the strips 11 over the top edge portions 9c of the strips 9 and secure the same together by stitching 16, as shown in Fig. 12.

Then the thus assembled pocket-forming unit (Fig. 12), which I generally designate by the numeral 20, is mounted on and secured to the body 5 by stitching the outer edges 8c of strips 8 to the outer inturned edges of the body 5, as shown in Fig. 15. Preferably the inner side edges 11d of the strips 11 are hemmed, as shown at 11e in Fig. 12.

The ends of the pocket-forming unit 20 are secured to the end of the body 5 in the following manner: In Fig. 13 the parts are shown as they appear before the ends of the pocket-forming unit are secured to the body. It will be observed from this figure that by virtue of the ends 11b, the strips 11 being diagonally cut, the portions of the strips 11 at their inner end corners are spaced from the ends of the body. However, in securing said ends to the body, as shown in Fig. 14, I draw the diagonal ends 11a into position parallel with the straight ends of the body and secure them to the ends of the body in that position, the side strips 9 being folded outwardly at their ends between the strips 8 and 11 and being secured to said strips and to the body by stitching.

By means of the foregoing described construction, the inner edges 11d of the strips 11, which strips form the tops of the diaper-holding pocket, are placed in tension, which insures that the diaper D will be retained in proper position during wear. Also, the access opening to the pocket, defined by the inner edges 11d of strips 11 extends from end to end of the body to facilitate insertion and removal of the diaper. This relatively long access opening is made possible and practicable by the ends 11b of the strips 11 being cut diagonally and then drawn into linear alinement or into position parallel with the straight ends of the body, which tends to confine the diaper in the pocket and also imparts a curve to the garment.

It is my preference to provide a bib member 25 secured to one end of the body and a pair of suspender straps 26 arranged at one end to be buttoned to the bib and secured at their other ends to the body in side-edge to side-edge abutting relationship between the inner side edges of the strips 11 so that the suspender straps, when the garment is being worn, tend further to maintain the longitudinal tension on the inner edges of the strip 11.

On one end of the garment I provide fastener elements 30, and on the other end I provide a row of cooperating fastener elements 31, so that the garment may be secured about the waist of the infant, as shown in Fig. 1. There are extra fastener elements 31 provided for purposes of adjustment.

I claim:

A diaper holding garment comprising a fabric bottom sheet which is relatively narrow intermediate its ends, a lining for said bottom sheet, a pair of top strips spaced apart transversely of said bottom sheet and a pair of side strips secured to said lining and secured respectively to said respective top strips whereby to define a diaper receiving pocket accessible between said top strips, the end edge portions of each of said top strips being precut to be biased toward its outer edge, and transverse stitching securing said end edge portions of said top strips to said bottom sheet in transverse alignment whereby to maintain the inner edge portions of said top strips relatively more taut longitudinally than the outer edge portions thereof.

References Cited in the file of this patent

UNITED STATES PATENTS

| | | |
|---|---|---|
| 1,977,604 | Alsop | Oct. 23, 1934 |
| 2,471,556 | Birkle | May 31, 1949 |
| 2,575,164 | Donovan | Nov. 13, 1951 |
| 2,691,983 | Bernard | Oct. 19, 1954 |